United States Patent
Algüera et al.

(10) Patent No.: US 8,297,638 B2
(45) Date of Patent: Oct. 30, 2012

(54) EXTERNAL LINE CONNECTION FOR A SEMITRAILER OF A SEMITRAILER TRUCK

(75) Inventors: José Manuel Algüera, Aschaffenburg (DE); Michael Eiermann, Pfungstadt (DE)

(73) Assignee: Jost-Werke GmbH, Neu-Isenburg (DE)

( * ) Notice: Subject to any disclaimer, the term of this patent is extended or adjusted under 35 U.S.C. 154(b) by 364 days.

(21) Appl. No.: 12/309,369

(22) PCT Filed: Jul. 16, 2007

(86) PCT No.: PCT/EP2007/057334
§ 371 (c)(1),
(2), (4) Date: Jan. 15, 2009

(87) PCT Pub. No.: WO2008/009659
PCT Pub. Date: Jan. 24, 2008

(65) Prior Publication Data
US 2009/0200769 A1  Aug. 13, 2009

(30) Foreign Application Priority Data
Jul. 18, 2006 (DE) .......................... 10 2006 033 900

(51) Int. Cl.
*B62D 53/12* (2006.01)
(52) U.S. Cl. ..... 280/420; 280/434; 280/421; 280/425.1; 280/438.1
(58) Field of Classification Search .................. 280/420, 280/434, 438.1, 425.1, 421, 422, 433
See application file for complete search history.

(56) References Cited

U.S. PATENT DOCUMENTS

| | | | | |
|---|---|---|---|---|
| 5,000,472 A | * | 3/1991 | Vick, Jr. | 280/420 |
| 5,060,964 A | * | 10/1991 | Vick | 280/421 |
| 6,623,024 B1 | * | 9/2003 | Alguera Gallego et al. | 280/433 |
| 2005/0082787 A1 | * | 4/2005 | Dick | 280/415.1 |

FOREIGN PATENT DOCUMENTS

| | | |
|---|---|---|
| DE | 101 55 056 A1 | 6/2003 |
| DE | 10 2004 044 992 A1 | 4/2006 |
| DE | 102004044992 A1 * | 4/2006 |
| EP | 0 084 712 A2 | 8/1983 |
| EP | 0 816 211 A2 | 1/1998 |
| FR | 2 580 237 A1 | 10/1986 |

* cited by examiner

*Primary Examiner* — Lesley D Morris
*Assistant Examiner* — Jacob Knutson
(74) *Attorney, Agent, or Firm* — Hudak, Shunk & Farine Co. LPA

(57) ABSTRACT

An external line connection for a semitrailer of a semitrailer truck, comprising a frame structure having a skid plate closing off the underside, on which plate a king pin is arranged, and a connector bracket, arranged to be swivelable about the king pin, at least one line section being led out of said bracket and being connectable to a power supply system of the semitrailer. The aim of the invention is to provide a low-wear external line connection from the connector bracket to the semitrailer. For this purpose, the connector bracket of the external line connection acts upon a turntable which is swivelably received on the skid plate. At least one line section is led out from the top of the turntable and rests on both sides of the turntable in subsections, the subsections being maintained under tensile stress via a prestressing device.

22 Claims, 3 Drawing Sheets

Fig.: 1
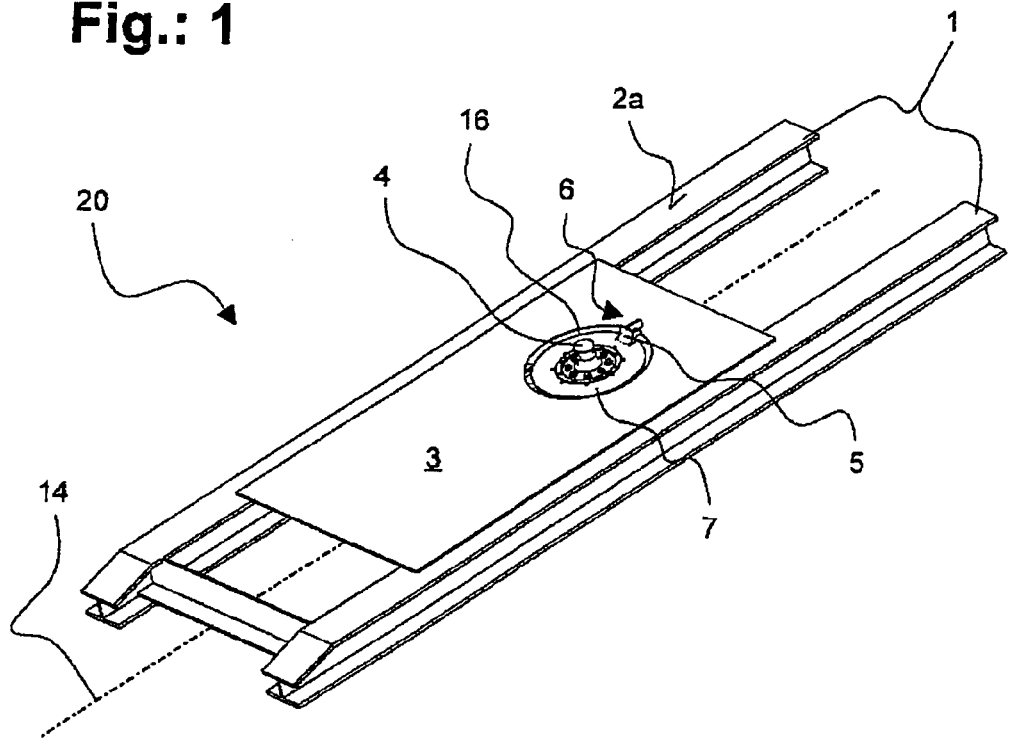
Fig.: 2
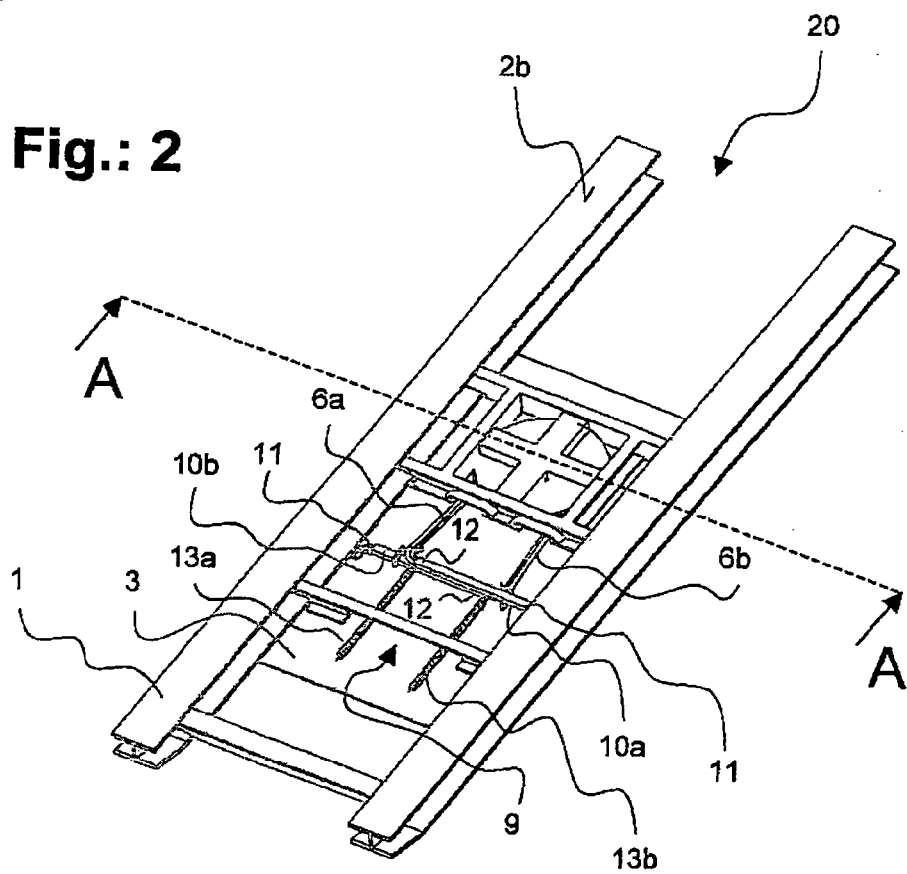

Fig.: 3
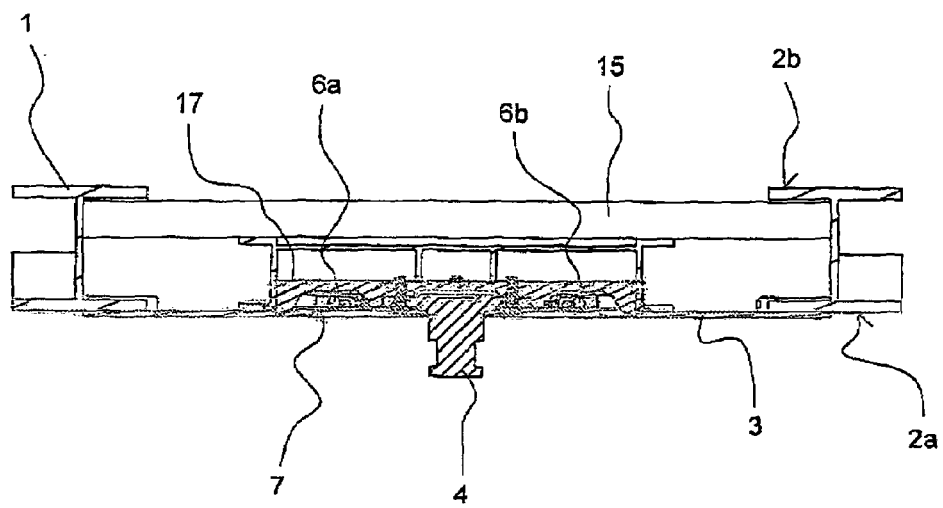
Fig.: 4
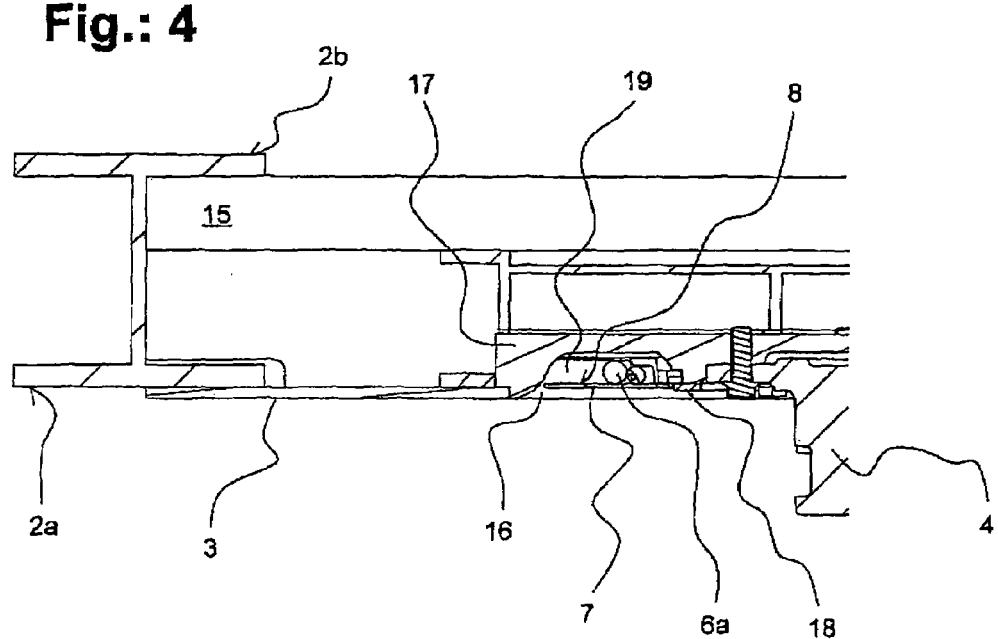

Fig.: 5
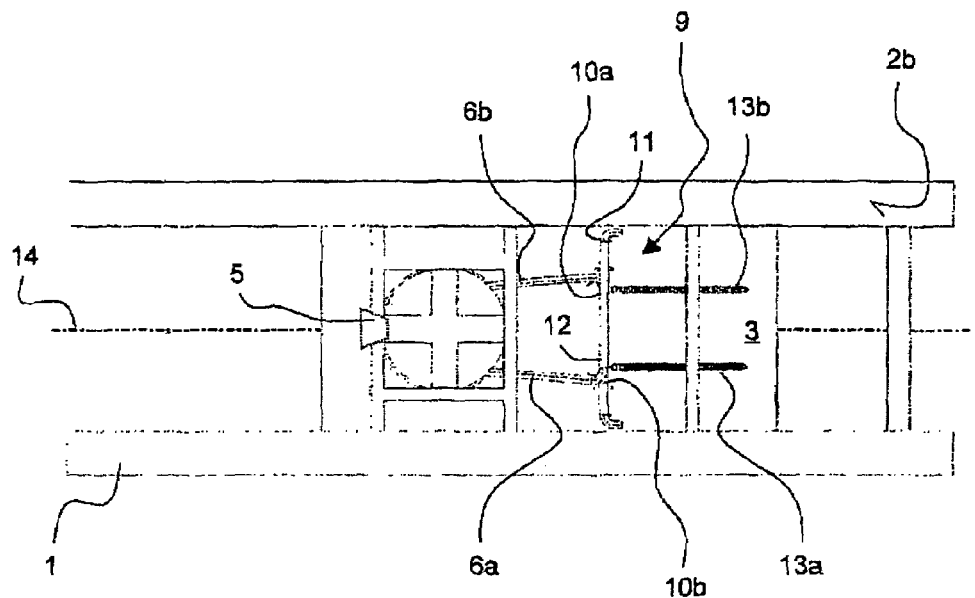
Fig.: 6
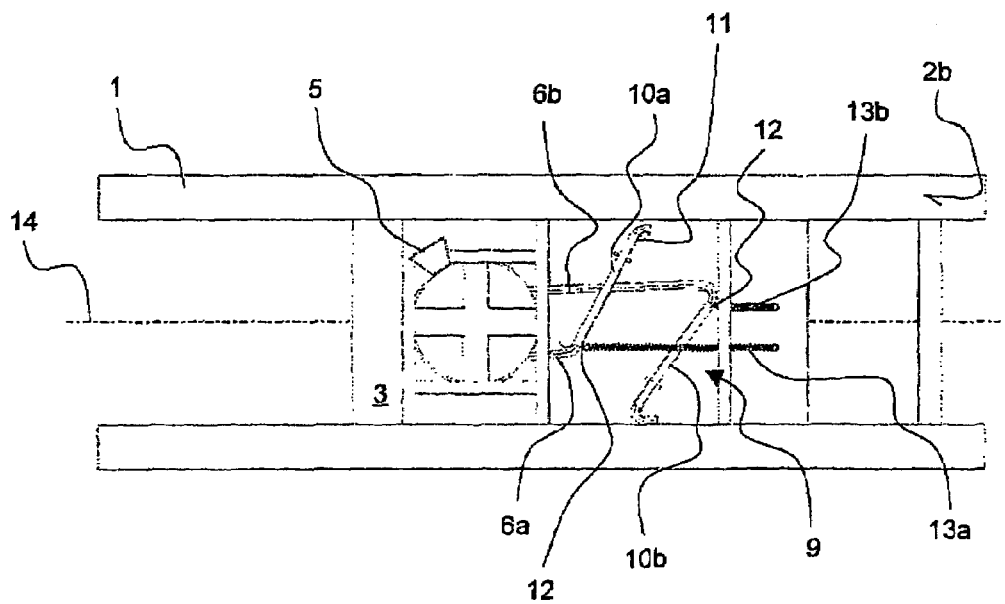

EXTERNAL LINE CONNECTION FOR A SEMITRAILER OF A SEMITRAILER TRUCK

FIELD OF INVENTION

The invention concerns an external line connection for a semitrailer of a semitrailer truck, comprising a frame structure with a skid plate closing off the underside, on which plate a king pin is arranged, and a connector bracket, arranged to be swivelable about the king pin, from which at least one line section is led out and can be connected to a power supply system of the semitrailer.

BACKGROUND OF THE INVENTION

Such swivelable connector brackets are used, for example, in connection with automatically working plug-in coupling systems of supply lines, such as are also disclosed in DE 101 55 056. In the known system, a connector bracket can swivel about the king pin, and this is introduced into the insertion opening of the fifth wheel when hooking up the semitrailer. In this end position, a contacting between a socket on the tractor side and a connector arranged in the connector bracket then takes place. In one simple embodiment, the supply lines, such as current and/or compressed air lines, are led out to the rear from the connector bracket and fastened on the semitrailer with enough slack that the semitrailer is able to swivel out when driving on a curve. But due to the slack in the lines, there have always been instances of damage or breaking of the lines.

To lessen the danger of line breakage, it is proposed in DE 10 2004 044 992 to make the supply lines taut and spring-loaded with a line accumulator which can be mounted on the underside of the semitrailer, making possible an unwinding of the line while driving along a curve. For this, the known line accumulator has a flat cable pulley as a winding drum, on which a segment of the supply line is wound up. The basic drawback of this device, however, is the low lifetime of the supply line, since the winding circumference of the supply line is relatively small and therefore the supply line is subject to a substantial bending stress, which often proceeds as far as incipient damage to the line material. A further aggravating factor is that the supply line is subject to an alternate bending while driving on a curve, so that irreversible damage can sometimes be caused to the material of the supply line. A further drawback of the known line accumulator is that, due to the exposed position beneath the semitrailer, the ISO specified semitrailer contour is not fulfilled.

SUMMARY OF THE INVENTION

For this reason, the basic problem of the invention is to provide a low-wear external line connection from a connector bracket to the semitrailer that complies with the specified ISO contour.

The problem is solved according to the invention with an external line connection in which the connector bracket acts upon a turntable which is swivelably received on the skid plate, wherein at least one line section is led out from the top of the turntable and rests on both sides of the turntable in subsections, the subsections being maintained under tensile stress via a prestressing device.

The subsections can both be identical in construction and each one can contain, for example, one current line and one compressed air line. It is also conceivable to provide control lines in addition in one or both subsections. Alternatively, it is also possible to bundle and accommodate all supply lines in a first subsection, so that the second subsection can be configured, for example, as a belt, tube, or cable, and serve exclusively to transmit the mechanical force. A wire cable or the like should be present in each subsection of the line for stress relief.

The benefit of the external line connection of the invention is that the subsections in driving operation are under bending strain in only one direction and only the bending radius changes to a slight degree when the semitrailer truck is driving along a curve. Furthermore, there is no significant relative motion between the particular subsection and the turntable, so that there is no wear and tear caused by friction-induced material abrasion. Furthermore, the cable outlet is especially protected.

In a special embodiment, the turntable is arranged concentrically about the king pin. This enables the use of conventional standardized king pins and facilitates the replacement of the king pin in event of wear.

Advantageously, the king pin is joined torque proof to the skid plate. The flow of force during driving operation travels from the tractor vehicle across the king pin to the semitrailer. For this reason, the king pin is subject to an extremely high mechanical loading and can be connected firmly to the skid plate, preferably with the help of a reinforcing bearing plate. If the king pin were mounted so that it could rotate, the flow of force would be transmitted from the king pin across a bearing to the semitrailer, so that an additional movable part would be present in the flow of force. Such a design has been abandoned in favor of a robust construction.

Preferably, the prestressing device comprises two tension arms which can swivel in opposite direction, on each of which one subsection rests. It has turned out to be especially favorable for the tension arms to be pivotably mounted at their first outer end and to engage with a spring element at their second opposite end. The fastening of the tension arms can be, in particular, to the frame structure. The two spring elements, which can be designed, for example, as helical springs, transmit a prestressing force to the respective tension arm, so that both subsections are pulled the same distance from the turntable. For this, one should use spring elements of the same kind with comparable spring constants.

The spring elements can be oriented parallel to the lengthwise axis of the vehicle. In this way, the spring elements engage with the tension arms at approximately a right angle over a broad range of their swivel angle and thereby contribute to an effective torque transmission and thus to an effective tensioning of the subsections.

The spring elements should be strained with a portion of their maximum spring travel for a connector bracket oriented in the lengthwise axis of the vehicle. This enables, depending on the direction of the curve and thus the direction of turning of the turntable, either a contraction of the spring element and thus a further tensioning of the subsection lying in the direction of turning or a corresponding follow-up of the subsection entering the turntable.

Advantageously, the tension arms are oriented perpendicular to the lengthwise axis of the vehicle for a connector bracket oriented in the lengthwise axis of the vehicle. This produces the advantage that both tension arms have an equal swivel path available to them in both directions and the spring elements are strained to an equal degree in both curve directions.

Preferably, the tension arms are arranged at a vertical offset from each other. Thanks to this design configuration, when the directions of the curve change the swivel arms swivel past each other without touching or mutually hindering each other.

According to one special embodiment, the tension arms are always oriented approximately parallel to each other, regardless of the position of the tractor vehicle to the semitrailer, since they cover an opposite but equally distant swivel path. This requires, among other things, also tension arms of the same length, and it minimizes the footprint of the external line connection. Furthermore, it is possible to have both tension arms of identical structural configuration, so that the keeping of replacement parts in the warehouse is easier.

Preferably, the frame structure has a cargo floor on its top side. The cargo floor supports the goods being transported by the semitrailer. A maintenance hatch is provided in the cargo floor, preferably above the external line connection. The subsections and the prestressing device are arranged in a free space between the skid plate and the cargo floor and thus protected against external influences.

Advantageously, the turntable stands back from the skid plate on the underside. Usually, the skid plate lies on the fifth wheel and swivels back and forth relative to it when negotiating curves. Thanks to the arrangement of the turntable set back from the skid plate, it lies outside the range of action of the fifth wheel, which considerably diminishes the risk of damages and wear of the entire external line connection.

In another preferred embodiment, the skid plate contains a recess and a bearing plate, with the bearing plate reaching across the recess and serving to receive the king pin. Thus, the bearing plate channels the loads acting on the king pin into the semitrailer or its skid plate over a large surface.

The turntable can, for example, lie frictionally engaged on a bearing flange coordinated with the bearing plate. This bearing flange can be, for example, an undercutting or a molded-on collar of the bearing plate. Alternatively, it is also possible to screw the bearing flange onto the bearing plate as a support ring. The turntable then lies loosely from above on the bearing flange. This simple way of mounting the turntable is extremely resistant to lubricating grease of the fifth wheel and other external influences. Furthermore, such a mounting has a much lower structural height than a roller bearing.

Preferably, the bearing plate has an annular cavity, in which the subsections run. This cavity should be of such height that both the turntable and the subsections inserted therein can freely run up and down in the circumferential direction. The turntable should lead the subsections in a groove provided for them, whose height is only slightly greater than the diameter of each subsection or the larger of the two subsections. The groove can also be stepped, so that the lines of the subsections do not have to be twisted against each other.

It is also advantageous if the annular cavity is for the most part closed-off at the bottom by the turntable, since this minimizes the entry of dirt and lubricating grease of the fifth wheel into the annular cavity.

BRIEF DESCRIPTION OF THE DRAWINGS

For a better understanding, the invention shall be explained more closely below by means of six figures. These show:

FIG. 1: a perspective bottom view of an external line connection;

FIG. 2: a perspective top view of an external line connection;

FIG. 3: a cross section along line A:A in FIG. 2;

FIG. 4: a magnified cross section per FIG. 3;

FIG. 5: a top view of an external line connection in the straight position;

FIG. 6: a top view of an external line connection under maximum deflection of the turntable.

DETAILED DESCRIPTION OF THE INVENTION

FIG. 1 shows a perspective bottom view of an external line connection according to the invention, with a frame structure 1, whose underside 2 is closed off by a skid plate 3. The skid plate 3 thrusts against a fifth wheel (not shown) of the tractor vehicle when the semitrailer is in the hooked up state.

In one region of the lengthwise axis of the vehicle 14 the skid plate 3 has a round recess 16. Centrally inside the recess 16 is located a king pin 4, which actively engages with the fifth wheel and becomes locked therein when the tractor vehicle is hooked on. The king pin 4 is arranged torsion-free in regard to the skid plate 3. The recess 16 is covered around the king pin 4 by a pivoting mounted turntable 7. On the turntable 7 one notices, for example, a connector bracket 5, which mates with a complementary fashioned socket of the tractor vehicle when the semitrailer is in the hooked-up state and is connected in this way. A line section 6 on the semitrailer is led out from the connector bracket 5 at the side away from the king pin. The line section 6 can be led through the turntable 7 as a single section or already as several subsections 6a, 6b (see FIG. 2).

FIG. 2 shows the above described external line connection in a perspective top view. One notices that on either side of the turntable 7, here built over (see FIG. 1), there emerges a first subsection 6a and a second subsection 6b and runs to a prestressing device 9. The prestressing device 9 comprises a first and a second tension arm 10a, 10b. The tension arms 10a, 10b at their first outer end 11 can swivel about a vertical axis on the frame structure 1 and receive the respective subsection 6a, 6b at their opposite second end 12. Also, at the second end 12, a spring element 13a, 13b engages with each of the two tension arms 10a, 10b.

In the position shown, the semitrailer truck is driving in a straight line, so that the connector bracket 5 is oriented in the region of the lengthwise axis of the vehicle 14 (see FIG. 1) and the tension arms 10a, 10b are for the most part perpendicular to the lengthwise axis of the vehicle. The two spring elements 13a, 13b have traveled an identical spring distance in the straight driving position of the vehicle, which on the one hand still allows for a tensile action even as the respective tension arm 10a, 10b comes closer, and on the other hand permits a further elongation of the respective spring element 13a, 13b. This is necessary to enable a deflection of the tension arms 10a, 10b in both swivel directions when the semitrailer truck is driving on a curve. So that the swivel arms 10a, 10b do not interfere with each other, they are arranged with a vertical offset from each other.

The king pin 4, the turntable 7, the line section 6 with the subsections 6a, 6b and the prestressing device 9 are assembled into a front module 20, which can be fastened by means of the frame structure 1 on a vehicle frame of the semitrailer, not shown.

FIGS. 3 and 4 show a cross section along line A:A in FIG. 2, while FIG. 4 is a magnified feature of FIG. 3. On the top 2b of the frame structure 1 there is a cargo floor 15, on which goods being transported can be placed later on. At the opposite underside 2a, the frame structure 1 is closed by the skid plate 3. The skid plate 3 is pierced by the recess 16 in its middle region. At the top, this recess 16 is bridged over by a bearing plate 17, which is preferably welded to the skid plate 3 on its circumferential edge. The bearing plate 17 serves to receive the king pin 4 and a bearing flange 18 concentrically surrounding the king pin 4, which is mounted torsion-free on the bearing plate 17. In turn, the turntable 7 lies loosely on the bearing flange 18 and thus it can move in both directions of turning relative to the bearing plate 17.

On the top side 8 of the turntable 7, at either side of the king pin 4, there is found the subsection 6a or the subsection 6b. Each subsection 6a, 6b is made up of an inner compressed air line of smaller diameter and an outer electricity line of larger diameter. In order to have enough free space for the turntable 7 plus subsections 6a, 6b, the bearing plate 17 has an annular cavity 19. One also notices that the turntable 7 is set back in the recess 16 relative to the skid plate 3 in the vertical direction. In this way, an influencing of the function of the turntable 7 by a fifth wheel making contact with the skid plate is avoided.

FIGS. 5 and 6 show, for comparison, two different functional positions of the prestressing device 9 during straight travel and driving on a curve. In FIG. 5, the semitrailer truck is driving straight and the connector bracket 5, shown by broken lines because not actually visible in the top view, is fixed by the complementary shaped insertion opening of the fifth wheel (not shown) in the lengthwise axis of the vehicle 14. In this starting position, the two tension arms 10a, 10b lie one above the other and the spring elements 13a, 13b have traveled a portion of their maximum spring distance.

In the view of FIG. 6, the tractor vehicle is making a sharp right turn. Since the connector bracket 5 is held by form fitting in the insertion opening of the fifth wheel, it slides out clockwise from the lengthwise axis of the vehicle 14 by a swivel movement of the turntable 7. The two subsections 6a, 6b are connected by their origin stationary to the connector bracket 5. Thus, the subsection 6a has been pulled in by the turntable 7 and the first tension arm 10a has swiveled against the spring force of the spring element 13a in the direction of the turntable 7. To the same degree, the spring element 13b has been compressed and thereby it has pulled the tension arm 10b or its second end 12 away from the turntable 7, thus holding the subsection 6b under tension.

List of Reference Numbers 1 frame structure
2a bottom side of frame structure
2b top side of frame structure
3 skid plate
4 king pin
5 connector bracket
6 line section
6a first subsection
6b second subsection
7 turntable
8 top side of turntable
9 prestressing device
10a first tension arm
10b second tension arm
11 first end of tension arm
12 second end of tension arm
13a first spring element
13b second spring element
14 lengthwise axis of vehicle
15 cargo floor
16 recess of skid plate
17 bearing plate
18 bearing flange
19 annular cavity of bearing plate
20 front module

What is claimed is:

1. An external line connection for a semitrailer of a semitrailer truck, comprising: a frame structure with a skid plate closing off an underside, on which plate a king pin is arranged, and a connector bracket, arranged to be swivelable about the king pin, from which at least one line section is led out and can be connected to a power supply system of the semitrailer, wherein the connector bracket acts upon a turntable which is swivelably received on the skid plate, wherein the at least one line section is led out on a topside of the turntable and rests on both sides of the turntable in subsections, and the subsections are always maintained under tensile stress via a prestressing device.

2. The external line connection according to claim 1, wherein the turntable is arranged concentrically about the king pin.

3. The external line connection according to claim 1, wherein the king pin is joined torque proof to the skid plate.

4. The external line connection according to claim 1, wherein the prestressing device comprises two tension arms which can swivel in opposite direction, on each of which one of the subsections rests.

5. The external line connection according to claim 4, wherein the tension arms are arranged between the skid plate and a cargo floor.

6. The external line connection according to claim 4, wherein the tension arms are pivotably mounted at their first outer end and are prestressed by a spring element.

7. The external line connection according to claim 6, wherein the spring element engages at a second opposite end of the tension arm.

8. The external line connection according to claim 6, wherein the spring elements are oriented parallel to a lengthwise axis of the semitrailer.

9. The external line connection according to claim 6, wherein the spring elements are strained with a portion of their maximum spring travel for a connector bracket oriented in a lengthwise axis of the semitrailer.

10. The external line connection according to claim 4, wherein the tension arms are oriented perpendicular to the lengthwise axis of a vehicle for a connector bracket oriented in the lengthwise axis of the semitrailer.

11. The external line connection according to claim 4, wherein the tension arms are arranged at different height levels.

12. The external line connection according to claim 4, wherein the tension arms are always approximately parallel to each other.

13. The external line connection according to claim 1, wherein the frame structure has a cargo floor on its top side.

14. The external line connection according to claim 1, wherein the turntable is set back from the skid plate on the underside.

15. The external line connection according to claim 1, wherein the skid plate contains a recess and a bearing plate, with the bearing plate reaching across the recess and serving to receive the king pin.

16. The external line connection according to claim 15, wherein the turntable lies frictionally engaged on a bearing flange coordinated with the bearing plate.

17. The external line connection according to claim 15, wherein the bearing plate has an annular cavity, in which the subsections run.

18. The external line connection according to claim 17, wherein the annular cavity is for the most part closed off at a bottom by the turntable.

19. The external line connection according to claim 1, wherein the turntable is arranged concentrically about the king pin, wherein the king pin is joined torque proof to the skid plate, wherein the prestressing device comprises two tension arms which can swivel in opposite direction, on each of which one subsection rests, and wherein the tension arms are arranged between the skid plate and a cargo floor.

20. The external line connection according to claim 19, wherein the tension arms are pivotably mounted at their first outer end and are prestressed by a spring element, wherein the spring element engages at a second opposite end of the tension arm, and wherein the spring elements is oriented parallel to a lengthwise axis of the semitrailer.

21. An external line connection for a semitrailer of a semitrailer truck, comprising: a frame structure with a skid plate closing off an underside, on which plate a king pin is arranged, and a connector bracket, arranged to be swivelable about the king pin, from which at least one line section is led out and can be connected to a power supply system of the semitrailer, wherein the connector bracket acts upon a turntable which is swivelably received on the skid plate, wherein the at least one line section is led out on a topside of the turntable and rests on both sides of the turntable in subsections, and the subsections run to a prestressing device that always maintains the subsections under tensile stress.

22. An external line connection for a semitrailer truck, comprising:
a frame structure with a cargo floor on its top side and with a skid plate closing off an underside, on which a king pin is arranged, and a connector bracket, arranged to be swivelable about the king pin, from which at least one line section is led out and can be connected to a power supply system of the semitrailer, wherein the connector bracket acts upon a turntable which is swivelably received on the skid plate, wherein the at least one line section is led out on a top side of the turntable and rests on both sides of the turntable in subsections, and the subsections are maintained under tensile stress via a prestressing device, wherein the subsections and the prestressing device are arranged in a free space between the skid plate and the cargo floor.

* * * * *